US012412903B1

United States Patent
Zeng

(10) Patent No.: US 12,412,903 B1
(45) Date of Patent: Sep. 9, 2025

(54) METALLIZED CURRENT COLLECTOR FOR STACKED BATTERY

(71) Applicant: Stacked Energy, Inc., San Jose, CA (US)

(72) Inventor: Qingcheng Zeng, San Jose, CA (US)

(73) Assignee: Stacked Energy, Inc., San Jose, CA (US)

( * ) Notice: Subject to any disclaimer, the term of this patent is extended or adjusted under 35 U.S.C. 154(b) by 310 days.

(21) Appl. No.: 18/313,897

(22) Filed: May 8, 2023

Related U.S. Application Data

(62) Division of application No. 16/108,503, filed on Aug. 22, 2018, now Pat. No. 11,862,801.

(Continued)

(51) Int. Cl.
 *H01M 4/66* (2006.01)
 *H01M 4/02* (2006.01)
 (Continued)

(52) U.S. Cl.
 CPC .......... *H01M 4/661* (2013.01); *H01M 4/621* (2013.01); *H01M 4/624* (2013.01); *H01M 10/0525* (2013.01); *H01M 10/0585* (2013.01); *H01M 50/197* (2021.01); *H01M 50/40* (2021.01); *H01M 50/534* (2021.01); *H01M 2004/027* (2013.01); *H01M 2004/028* (2013.01)

(58) Field of Classification Search
 None
 See application file for complete search history.

(56) References Cited

U.S. PATENT DOCUMENTS

| 4,317,864 A | 3/1982 | Strasser |
| 4,374,186 A | 2/1983 | McCartney et al. |

(Continued)

FOREIGN PATENT DOCUMENTS

| CN | 1620735 A | 5/2005 |
| CN | 101202355 A | 6/2008 |

(Continued)

OTHER PUBLICATIONS

China Patent Application No. 201880026199.1, Office Action, Apr. 30, 2024, 22 pages.

(Continued)

*Primary Examiner* — Scott J. Chmielecki
(74) *Attorney, Agent, or Firm* — Fenwick & West LLP

(57) ABSTRACT

Batteries according to embodiments of the present technology may include a stacked battery cell having a first and second battery cell. The first battery cell may include a first cathode current collector comprising a first polymer and a first metal at least partially coating the first polymer, and a first anode current collector comprising may comprise a second polymer and a second metal at least partially coating the second polymer. The second battery cell may include a second cathode current collector comprising the first polymer and the first metal at least partially coating the first polymer, and a second anode current collector comprising the second polymer and the second metal at least partially coating the second polymer. The first anode current collector is coupled with the second cathode current collector along a first surface of the first anode current collector and a first surface of the second cathode current collector.

9 Claims, 4 Drawing Sheets

Related U.S. Application Data

(60) Provisional application No. 62/558,465, filed on Sep. 14, 2017.

(51) Int. Cl.
  *H01M 4/62* (2006.01)
  *H01M 10/0525* (2010.01)
  *H01M 10/0585* (2010.01)
  *H01M 50/197* (2021.01)
  *H01M 50/40* (2021.01)
  *H01M 50/534* (2021.01)

(56) References Cited

U.S. PATENT DOCUMENTS

| | | |
|---|---|---|
| 4,567,119 A | 1/1986 | Lim |
| 5,162,172 A | 11/1992 | Kaun |
| 5,254,415 A | 10/1993 | Williams et al. |
| 5,367,431 A | 11/1994 | Kunishi et al. |
| 6,004,698 A | 12/1999 | Richardson et al. |
| 8,124,266 B2 | 2/2012 | Yamazaki |
| 8,153,410 B2 | 4/2012 | Jaffe |
| 8,357,469 B2 | 1/2013 | Shaffer, II et al. |
| 8,663,833 B2 | 3/2014 | Hosaka et al. |
| 9,142,811 B2 | 9/2015 | Chami |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,228,074 B2 | 1/2022 | Kaye et al. |
| 11,296,361 B2 | 4/2022 | Chu et al. |
| 11,335,977 B1 | 5/2022 | Zeng et al. |
| 11,532,824 B2 | 12/2022 | Chu et al. |
| 11,588,155 B1 | 2/2023 | Erb et al. |
| 11,600,891 B1 | 3/2023 | Erb et al. |
| 11,677,120 B2 | 6/2023 | Erb et al. |
| 11,699,815 B1 | 7/2023 | Zeng et al. |
| 11,791,470 B2 | 10/2023 | Campbell et al. |
| 11,862,801 B1 | 1/2024 | Zeng |
| 11,888,112 B2 | 1/2024 | Kaye et al. |
| 11,923,494 B2 | 3/2024 | Erb et al. |
| 2002/0146620 A1 | 10/2002 | Connell |
| 2003/0027051 A1 | 2/2003 | Kejha et al. |
| 2003/0096170 A1 | 5/2003 | Fujiwara et al. |
| 2003/0194605 A1 | 10/2003 | Fauteux et al. |
| 2004/0001302 A1 | 1/2004 | Sato et al. |
| 2005/0019643 A1 | 1/2005 | Sugita et al. |
| 2005/0106456 A1 | 5/2005 | Puester et al. |
| 2007/0210760 A1 | 9/2007 | Shimamura et al. |
| 2009/0023059 A1 | 1/2009 | Kinoshita et al. |
| 2009/0068531 A1 | 3/2009 | Sawa et al. |
| 2009/0087728 A1 | 4/2009 | Less et al. |
| 2009/0136832 A1 | 5/2009 | Mitsuda et al. |
| 2009/0233175 A1 | 9/2009 | Kelley et al. |
| 2009/0297892 A1 | 12/2009 | Ijaz et al. |
| 2010/0124693 A1 | 5/2010 | Kosugi et al. |
| 2010/0134942 A1 | 6/2010 | Wang et al. |
| 2010/0285355 A1 | 11/2010 | Kozinsky et al. |
| 2011/0294007 A1 | 12/2011 | Hosaka et al. |
| 2012/0148913 A1 | 6/2012 | Chiba |
| 2012/0156552 A1 | 6/2012 | Miyazaki et al. |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust |
| 2013/0089774 A1* | 4/2013 | Chami ............... H01M 4/043 29/623.2 |
| 2013/0242593 A1 | 9/2013 | LoRocco et al. |
| 2013/0266823 A1 | 10/2013 | Lee |
| 2014/0127542 A1 | 5/2014 | Li et al. |
| 2014/0154542 A1 | 6/2014 | Issaev et al. |
| 2014/0178753 A1 | 6/2014 | Chu et al. |
| 2015/0037616 A1 | 2/2015 | Wyatt et al. |
| 2015/0155564 A1* | 6/2015 | Chami ............... H01M 10/0468 29/623.5 |
| 2015/0228937 A1 | 8/2015 | Spilker |
| 2015/0311490 A1 | 10/2015 | Murase et al. |
| 2015/0325894 A1 | 11/2015 | Merriman et al. |
| 2016/0049679 A1 | 2/2016 | Stevens et al. |
| 2016/0093845 A1 | 3/2016 | DeKeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1 | 7/2016 | Blaser et al. |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0133689 A1 | 5/2017 | Moore et al. |
| 2017/0214057 A1 | 7/2017 | Kotik et al. |
| 2018/0013144 A1* | 1/2018 | Li ................. H01M 4/42 |
| 2018/0219227 A1 | 8/2018 | Moomaw et al. |
| 2018/0226654 A1 | 8/2018 | Ohsawa et al. |
| 2018/0316063 A1 | 11/2018 | Masel et al. |
| 2019/0036147 A1 | 1/2019 | Yuan et al. |
| 2020/0395594 A1 | 12/2020 | Doi et al. |
| 2022/0111758 A1 | 4/2022 | Ijaz et al. |
| 2022/0111759 A1 | 4/2022 | Ijaz |
| 2022/0115897 A1 | 4/2022 | Ijaz |
| 2023/0026549 A1 | 1/2023 | Ijaz et al. |

FOREIGN PATENT DOCUMENTS

| | | |
|---|---|---|
| CN | 101809801 A | 8/2010 |
| CN | 101884125 A | 11/2010 |
| CN | 102005566 A | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103855360 A | 6/2014 |
| CN | 103904294 A | 7/2014 |
| CN | 104466191 A | 3/2015 |
| CN | 104604003 A | 5/2015 |
| CN | 107851747 A | 3/2018 |
| EP | 1125336 A1 | 8/2001 |
| EP | 1156547 A1 | 11/2001 |
| EP | 2892097 A1 | 7/2015 |
| EP | 3196955 A1 | 7/2017 |
| EP | 3317907 A | 5/2018 |
| EP | 3435473 A1 | 1/2019 |
| JP | 06503442 A | 4/1994 |
| JP | 07061346 A | 6/1995 |
| JP | 2002343452 A | 11/2002 |
| JP | 2003096219 A | 4/2003 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018083957 A | 5/2018 |
| JP | 2018519646 A | 7/2018 |
| JP | 6636607 | 12/2019 |
| KR | 20130066795 A | 6/2013 |
| WO | 8504287 A1 | 9/1985 |
| WO | 9210861 A1 | 6/1992 |
| WO | 2010111087 A1 | 9/2010 |
| WO | 2016031689 A1 | 3/2016 |
| WO | 2017007827 A1 | 1/2017 |
| WO | 2018057566 A1 | 3/2018 |

(56) References Cited

FOREIGN PATENT DOCUMENTS

| WO | 2018195372 A1 | 10/2018 |
|---|---|---|
| WO | 2018213601 A2 | 11/2018 |
| WO | 2019059133 A1 | 3/2019 |
| WO | 2019184311 A1 | 10/2019 |
| WO | 2021048028 A1 | 3/2021 |

OTHER PUBLICATIONS

U.S. Appl. No. 15/742,009, Final Office Action, Mailed On Aug. 19, 2020, 13 pages.
U.S. Appl. No. 15/742,009, Non-Final Office Action, Mailed On Nov. 30, 2020, 13 pages.
U.S. Appl. No. 15/742,009, Non-Final Office Action, Mailed On Nov. 15, 2019, 14 pages.
U.S. Appl. No. 15/742,009, Non-Final Office Action, Mailed On Aug. 3, 2021, 16 pages.
U.S. Appl. No. 15/742,009, Notice of Allowance, Mailed On Dec. 24, 2021, 12 pages.
U.S. Appl. No. 15/962,133, Final Office Action, Mailed On Jul. 7, 2020, 5 pages.
U.S. Appl. No. 15/962,133, Non-Final Office Action, Mailed On Jan. 21, 2020, 10 pages.
U.S. Appl. No. 15/962,133, Notice of Allowance, Mailed On Feb. 9, 2021, 8 pages.
U.S. Appl. No. 16/007,534, Non-Final Office Action, Mailed On May 5, 2020, 11 pages.
U.S. Appl. No. 16/007,534, Notice of Allowance, Mailed On Nov. 18, 2020, 8 pages.
U.S. Appl. No. 16/038,865, Final Office Action, Mailed On Jun. 1, 2021, 7 pages.
U.S. Appl. No. 16/038,865, Non-Final Office Action, Mailed On Nov. 6, 2020, 13 pages.
U.S. Appl. No. 16/038,865, Notice of Allowance, Mailed On Aug. 13, 2021, 8 pages.
U.S. Appl. No. 16/049,250, Non-Final Office Action, Mailed On Apr. 8, 2020, 8 pages.
U.S. Appl. No. 16/049,250, Notice of Allowance, Mailed On Oct. 7, 2020, 7 pages.
U.S. Appl. No. 16/108,498, Final Office Action, Mailed On Dec. 9, 2020, 25 pages.
U.S. Appl. No. 16/108,498, Non-Final Office Action, Mailed On May 17, 2021, 21 pages.
U.S. Appl. No. 16/108,498, Non-Final Office Action, Mailed On Apr. 30, 2020, 9 pages.
U.S. Appl. No. 16/108,498, Notice of Allowance, Mailed On Feb. 24, 2022, 11 pages.
U.S. Appl. No. 16/108,503, Final Office Action, Mailed On Oct. 12, 2022, 8 pages.
U.S. Appl. No. 16/108,503, Final Office Action, Mailed On May 25, 2021, 9 pages.
U.S. Appl. No. 16/108,503, Non-Final Office Action, Mailed On Oct. 2, 2020, 11 pages.
U.S. Appl. No. 16/108,503, Non-Final Office Action, Mailed On Feb. 2, 2022, 9 pages.
U.S. Appl. No. 16/108,503, Notice of Allowance, Mailed On Feb. 10, 2023, 8 pages.
U.S. Appl. No. 16/108,522, Non-Final Office Action, Mailed On Sep. 9, 2020, 10 pages.
U.S. Appl. No. 16/108,522, Notice of Allowance, Mailed On Feb. 26, 2021, 8 pages.
U.S. Appl. No. 16/263,890, Non-Final Office Action, Mailed On Jun. 16, 2020, 9 pages.
U.S. Appl. No. 16/263,890, Notice of Allowance, Mailed On Oct. 23, 2020, 8 pages.
U.S. Appl. No. 16/273,625, Final Office Action, Mailed On Feb. 16, 2021, 14 pages.
U.S. Appl. No. 16/273,625, Non-Final Office Action, Mailed On May 4, 2020, 14 pages.
U.S. Appl. No. 16/273,625, Non-Final Office Action, Mailed On Dec. 24, 2021, 16 pages.
U.S. Appl. No. 16/273,625, Notice of Allowance, Mailed On Sep. 1, 2022, 12 pages.
U.S. Appl. No. 16/613,094, Final Office Action, Mailed On Jan. 23, 2023, 15 pages.
U.S. Appl. No. 16/613,094, Non Final Office Action, Mailed On Aug. 19, 2022, 16 Pages.
U.S. Appl. No. 16/658,442, Final Office Action, Mailed On Aug. 16, 2022, 15 pages.
U.S. Appl. No. 16/658,442, Non-Final Office Action, Mailed On Feb. 22, 2022, 16 pages.
U.S. Appl. No. 16/683,088, Final Office Action, Mailed On Oct. 12, 2021, 12 pages.
U.S. Appl. No. 16/683,088, Non-Final Office Action, Mailed On Sep. 2, 2021, 10 pages.
U.S. Appl. No. 16/683,088, Notice of Allowance, Mailed On Nov. 22, 2021, 8 pages.
U.S. Appl. No. 16/683,091, Non-Final Office Action, Mailed On Aug. 18, 2021, 22 pages.
U.S. Appl. No. 17/014,550, Notice of Allowance, Mailed On Oct. 18, 2022, 10 pages.
U.S. Appl. No. 17/014,637, Final Office Action, Mailed On Dec. 1, 2022, 24 pages.
U.S. Appl. No. 17/014,637, Non-Final Office Action, Mailed On Feb. 24, 2022, 20 pages.
U.S. Appl. No. 17/014,637, Non-Final Office Action, Mailed On Jul. 25, 2022, 20 pages.
U.S. Appl. No. 17/014,717, Non-Final Office Action, Mailed On Oct. 13, 2022, 14 pages.
U.S. Appl. No. 17/014,717, Notice of Allowance, Mailed On Jan. 31, 2023, 7 pages.
U.S. Appl. No. 17/014,768, Non-Final Office Action, Mailed On Jun. 30, 2022, 10 pages.
U.S. Appl. No. 17/014,768, Notice of Allowance, Mailed On Nov. 4, 2022, 7 pages.
U.S. Appl. No. 17/353,059, Non-Final Office Action, Mailed On Nov. 1, 2022, 8 pages.
U.S. Appl. No. 17/353,059, Notice of Allowance, Mailed On Feb. 28, 2023, 8 pages.
Boeva et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry, vol. 4, No. 100, Oct. 31, 2014, pp. 56677-56681.
China Patent Application No. 201680039891.9, Notice of Decision to Grant, Mailed On Mar. 22, 2021, 2 pages.
China Patent Application No. 201680039891.9, Office Action, Mailed On Jun. 10, 2020, 18 pages.
China Patent Application No. 201680039891.9, Office Action, Mailed On Jan. 6, 2020, 23 pages.
China Patent Application No. 201680039891.9, Office Action, Mailed On Oct. 27, 2020, 8 pages.
China Patent Application No. 201780053071.X, Office Action, Mailed On Mar. 18, 2022, 15 pages.
China Patent Application No. 201780053071.X Office Action, Mailed On Nov. 2, 2021, 20 pages.
China Patent Application No. 201780053071.X Office Action, Mailed On Apr. 16, 2021, 21 pages.
China Patent Application No. 201780053071.X, Office Action, Mailed On Aug. 30, 2022, 29 pages.
China Patent Application No. 201780053071.X, Office Action, Mailed On Apr. 27, 2023, 9 pages.
China Patent Application No. 201880026199.1, Office Action, Mailed On Dec. 15, 2022, 13 pages.
China Patent Application No. 201880026199.1, Office Action, Mailed On Mar. 3, 2022, 8 pages.
China Patent Application No. 202011204662.2, Office Action, Mailed On Aug. 26, 2022, 14 pages.
China Patent Application No. 202011211648.5, Notice of Decision to Grant, Mailed On Mar. 6, 2023, 2 pages.
China Patent Application No. 202011211648.5, Office Action, Mailed On Aug. 19, 2022, 12 pages.

(56) References Cited

OTHER PUBLICATIONS

European Patent Application No. 16738994.9 , Notice of Decision to Grant, Mailed On Sep. 24, 2020, 2 pages.
European Patent Application No. 16738994.9 , Office Action, Mailed On Mar. 23, 2018, 3 pages.
Japan Patent Application No. 2018-500449 , Notice of Decision to Grant, Mailed On Nov. 18, 2019, 2 pages.
Japan Patent Application No. 2018-500449 , Office Action, Mailed On Jan. 21, 2019, 11 pages.
Korea Patent Application No. 10-2018-7000263 , Notice of Decision to Grant, Mailed On Apr. 8, 2020, 2 pages.
Korea Patent Application No. 10-2018-7000263 , Office Action, Mailed On Sep. 27, 2019, 16 pages.
Korea Patent Application No. 10-2018-7000263 , Office Action, Mailed On Feb. 28, 2019, 5 pages.
International Patent Application No. PCT/US2016/041151 , International Preliminary Report on Patentability, Mailed On Jan. 18, 2018, 8 pages.
International Patent Application No. PCT/US2016/041151 , International Search Report and Written Opinion, Mailed On Aug. 25, 2016, 10 pages.
International Patent Application No. PCT/US2017/052413 , International Preliminary Report on Patentability, Mailed On Apr. 4, 2019, 12 pages.
International Patent Application No. PCT/US2017/052413 , International Search Report and Written Opinion, Mailed On Feb. 1, 2018, 19 pages.
International Patent Application No. PCT/US2017/052413 , "Invitation to Pay Additional Fees and, Where Applicable, Protest Fee", Dec. 8, 2017, 11 pages.
International Patent Application No. PCT/US2018/028472 , International Preliminary Report on Patentability, Mailed On Oct. 31, 2019, 10 pages.
International Patent Application No. PCT/US2018/028472 , International Search Report and Written Opinion, Mailed On Jul. 27, 2018, 13 pages.
International Patent Application No. PCT/US2018/033218 , International Preliminary Report on Patentability, Mailed On Nov. 28, 2019, 9 pages.
International Patent Application No. PCT/US2018/033218 , International Search Report and Written Opinion, Mailed On Nov. 16, 2018, 13 pages.
International Patent Application No. PCT/US2018/042598 , International Preliminary Report on Patentability, Mailed On Feb. 6, 2020, 10 pages.
Application No. PCT/US2020/060348 , International Preliminary Report on Patentability, Mailed On May 27, 2022, 8 pages.
International Patent Application No. PCT/US2020/060348 , International Search Report and Written Opinion, Mailed On Mar. 12, 2021, 9 pages.
International Patent Application No. PCT/US2020/060350 , International Preliminary Report on Patentability, Mailed On May 27, 2022, 8 pages.
International Patent Application No. PCT/US2020/060350 , International Search Report and Written Opinion, Mailed On Mar. 12, 2021, 12 pages.
International Patent Application No. PCT/US2021/049023 , International Preliminary Report on Patentability, Mailed On Mar. 23, 2023, 8 pages.
International Patent Application No. PCT/US2021/049023 , International Search Report and Written Opinion, Mailed On Dec. 22, 2021, 11 pages.
Thuc et al., "Study on Synthesis and Characterization of Anion Exchange Membrane Based on Poly (Vinyl Alcohol) Modified by Free-Radical Polymerization", International Journal of Electrochemical Science, vol. 15, Jul. 10, 2020, pp. 8190-8199.
Weng et al., "Three-Electrolyte Electrochemical Energy Storage Systems Using Both Anion- and Cation-Exchange Membranes as Separators", Energy, vol. 167, Jan. 15, 2019, pp. 1-32.
China Patent Application No. 201880026199.1, "Office Action", May 10, 2023, 20 pages.

\* cited by examiner

METALLIZED CURRENT COLLECTOR FOR STACKED BATTERY

CROSS-REFERENCES TO RELATED APPLICATIONS

This application is a divisional of U.S. patent application Ser. No. 16/108,503, filed Aug. 22, 2018, which claims the benefit of U.S. Patent Application Ser. No. 62/558,465, filed Sep. 14, 2017. The disclosures of which are hereby incorporated by reference their entirety for all purposes.

TECHNICAL FIELD

The present technology relates to batteries and battery components. More specifically, the present technology relates to metal coated current collectors for stacked batteries.

BACKGROUND

Battery cells may include cathode and anode active material between two current collectors. The current collectors are generally conductive materials included in battery cells to distribute current to and from the cell.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Batteries according to embodiments of the present technology may include a battery cell having a first current collector including a polymer and a metal at least partially disposed about surfaces of the polymer. An edge region of the first current collector may be maintained free of the metal on a first surface of the first current collector. The battery cell may include a second current collector. The battery cell may also include a separator disposed between the first current collector and the second current collector. The separator may include a polymer, and the separator and the first current collector may be laminated proximate the edge region of the first current collector along the first surface of the first current collector.

In some embodiments, the second current collector may include a polymeric material, and the first current collector, the second current collector, and the separator may be laminated together proximate the edge region of the first current collector. The first current collector may be characterized by apertures defined through the polymer, and the metal may at least partially line sidewalls of the apertures. The battery cells may also include a conductive material disposed along the first surface of the first current collector. The conductive material may be disposed within the apertures defined through the polymer, and in some embodiments may be or include a conductive ink. The metal may substantially line the first surface of the first current collector within a first region of the current collector and substantially line a second surface of the current collector opposite the first surface of the current collector within a first region of the current collector. The metal may be selected from metals including aluminum, copper, nickel, tin, zinc, titanium, silver, molybdenum, palladium, and platinum.

Embodiments of the present technology may also encompass stacked batteries. The stacked batteries may include a first battery cell. The first battery cell may include a first cathode current collector having a first polymer and a first metal at least partially coating the first polymer. The first cathode current collector may be characterized by a first surface and a second surface opposite the first surface. The first battery cell may also include a first anode current collector having a second polymer and a second metal at least partially coating the second polymer. The first anode current collector may be characterized by a first surface and a second surface opposite the first surface. The stacked battery may also include a second battery cell. The second battery cell may include a second cathode current collector having the first polymer and the first metal at least partially coating the first polymer. The second cathode current collector may be characterized by a first surface and a second surface opposite the first surface. The second battery cell may also include a second anode current collector having the second polymer and the second metal at least partially coating the second polymer. The second anode current collector may be characterized by a first surface and a second surface opposite the first surface. The stacked battery may have the first anode current collector coupled with the second cathode current collector along the first surface of the first anode current collector and the first surface of the second cathode current collector.

In some embodiments, the first polymer of the first cathode current collector and the second cathode current collector may define apertures through the first polymer. The first metal may at least partially line the first surface, the second surface, and sidewalls of the apertures of the first cathode current collector and the second cathode current collector. The second polymer of the first anode current collector and the second anode current collector may define apertures through the second polymer. The second metal may at least partially line the first surface and sidewalls of the apertures of the first anode current collector and the second anode current collector. The stacked batteries may also include a conductive material coated along the first surface and the second surface of each current collector of the stacked battery. The conductive material may be disposed within apertures defined through each current collector of the stacked battery. The conductive material may include a conductive filler disposed within a binder. The first metal and the second metal may be selected from metals including aluminum, copper, nickel, tin, zinc, titanium, silver, molybdenum, palladium, and platinum. The first metal may be aluminum, and the second metal may be copper or nickel. The first polymer and the second polymer may include insulative polymers and either may be one or more of polypropylene, polyethylene, or polyethylene terephthalate.

Embodiments of the present technology also encompass methods of forming a current collector. The methods may include perforating a polymer film within a first region of the polymer film to define a plurality of apertures through the polymer film. The methods may include coating a conductive material across the first region of the polymer film along a first surface of the polymer film. The methods may include depositing a metal along a second surface of the polymer film opposite the first surface of the polymer film. The metal may at least partially line sidewalls of apertures of the plurality of apertures. The methods may also include coating the conductive material across the first region of the polymer film along a second surface of the polymer film. The conductive material may at least partially fill the apertures defined through the polymer film. In some embodiments, the depositing may include performing a chemical vapor deposition of the metal to conformally line the second surface of the polymer film. The conductive material may be or include a conductive filler disposed within a binder.

Such technology may provide numerous benefits over conventional technology. For example, the polymeric current collector may facilitate lamination of the battery cells. Additionally, the current collector design may create a tunable resistivity through and across the current collectors. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
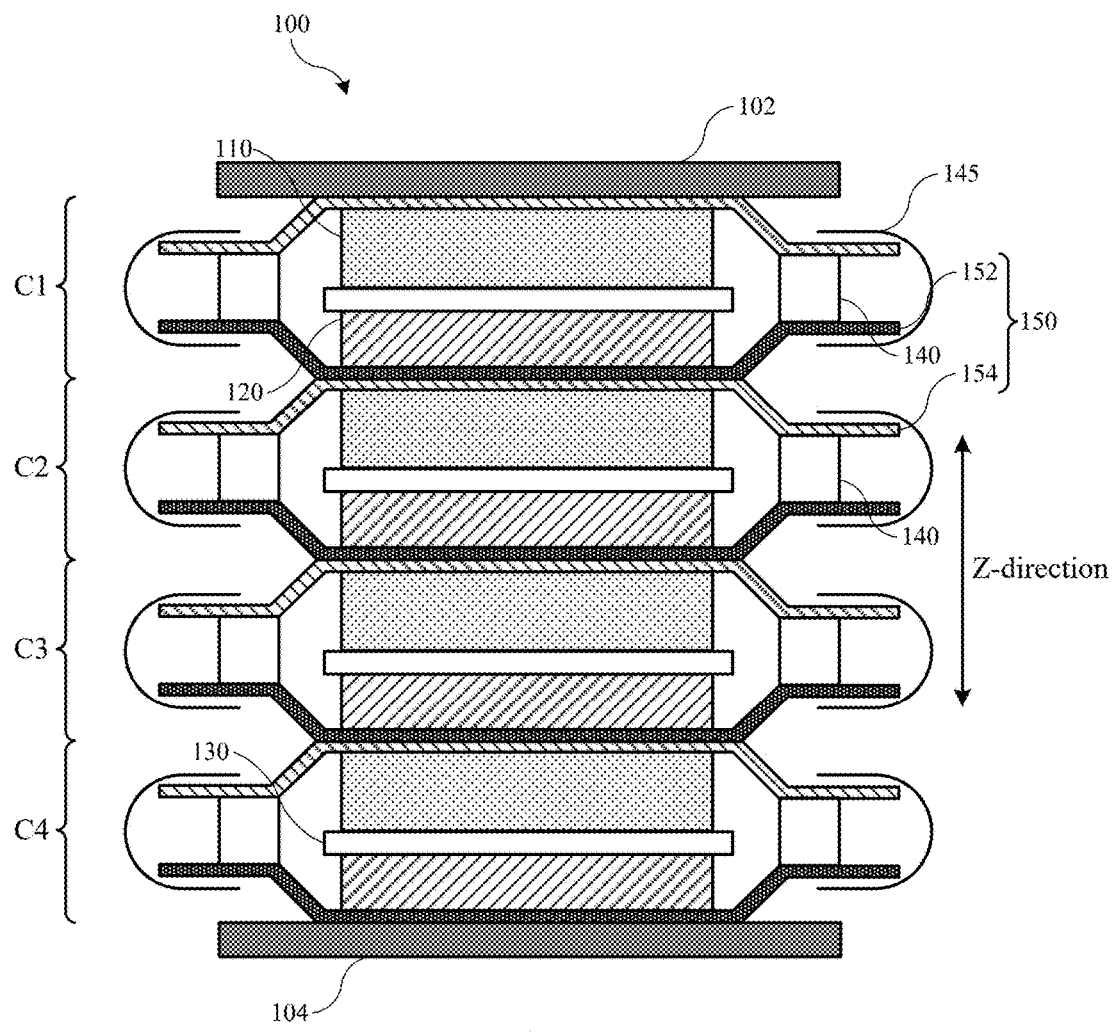
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, and more generally energy storage devices, may include multiple battery cells coupled with one another in a series or a parallel electrical configuration. The cells may also be physically coupled with one another to form the battery. Batteries having cells in a stacked orientation and characterized by z-direction transmission of current through the cells may have current collectors of adjacent cells in physical contact with one another. Using metal current collectors may facilitate through-cell transmission of current, although the metal current collectors may also maintain high conductivity in an xy-direction across the current collectors. Additionally, during cell formation, a seal material may be needed to form a fluid seal of the battery cell between the two conductive current collectors along an edge region of the battery cell.

The present technology may overcome many of these issues by utilizing a current collector formed with a polymeric material that may be insulative. A metallization layer may be formed about the polymer current collector to facilitate conductivity through the current collector to an adjacent cell. Additionally, a conductive material may be disposed within apertures of the polymer to provide additional z-direction electrical conductivity, while limiting xy-direction conductivity. The metallization and conductive material may be maintained within a preset region of the current collector, so that an edge region of the current collector may be the polymer. This polymer edge region may be used to couple with an additional polymer material directly to form a seal of the cell, while limiting any short circuit potential.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
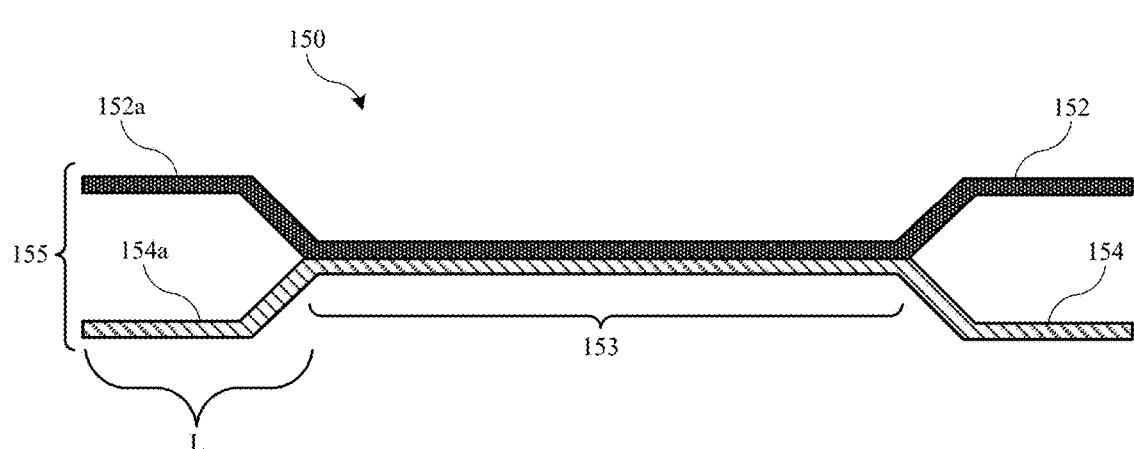
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive or adhesive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
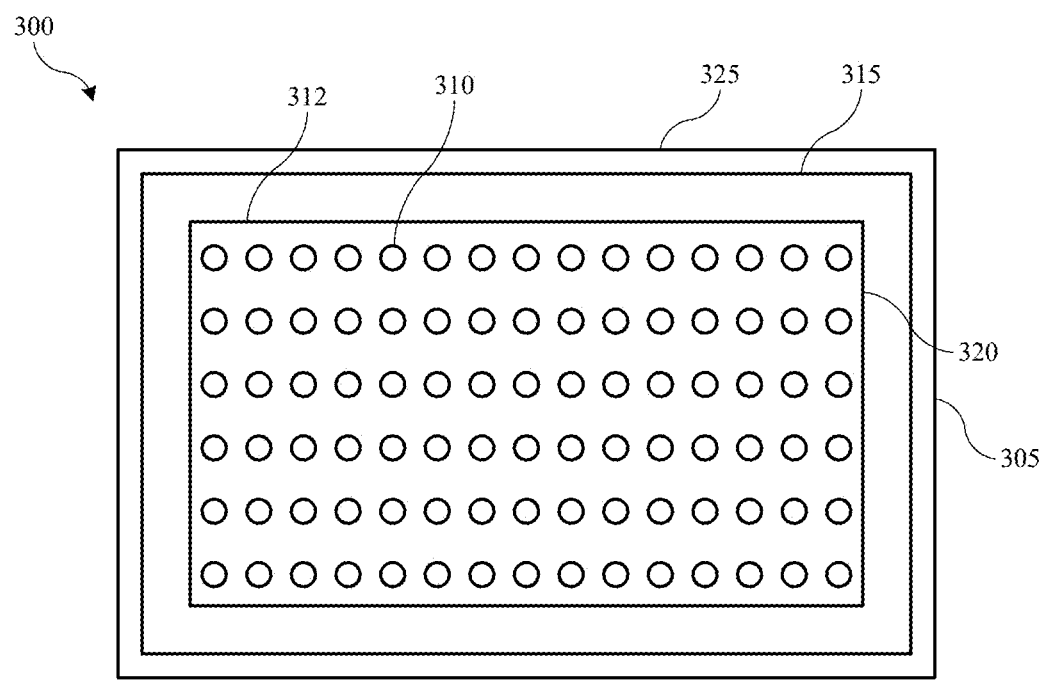
FIG. 3 shows a schematic plan view of an exemplary current collector according to some embodiments of the present technology.

Turning to FIG. 3 is shown a schematic top plan view of an exemplary current collector 300 according to some embodiments of the present technology. Current collector 300 may be included with stacked battery 100 discussed above, and in embodiments may be included as either or both of the cathode current collector or the anode current collector 152, 154. Current collector 300 may include multiple components that provide multiple benefits when utilized in a cell. Current collector 300 may include a polymer 305 defining the lateral dimensions of the current collector. In embodiments, current collector 300 may be less than or about 1 cm in any dimension. In other embodiments, current collector 300 may be characterized by a length greater than or about 1 cm, greater than or about 10 cm, greater than or about 1 m, or more in any lateral direction across the current collector.

Polymer 305 may have a plurality of apertures 310 defined through the polymer within a first region 312 of the polymer. First region 312 may extend partially or fully within a portion of current collector 300 intended to be the connection region 153, or a region in which the active materials may be disposed across the current collector. A metal 315 may be disposed across a portion of polymer 305. Metal 315 may be coated as a layer on the polymer 305, and in embodiments is not incorporated within the polymer, although it may be coated along several surfaces of the polymer. Metal 315 may extend towards an edge region 325 of polymer 305, however in some embodiments edge region 325 may be maintained free of the metal on at least one surface of the polymer. As discussed above, a separator disposed between active materials may also be a polymeric material. When metal or other conductive materials are included through the edge regions of the current collectors, seal 140 may be used to prevent shorting between the two current collectors. However, when the current collectors include a non-conductive polymer 305, the edge region 325 may be used to produce the battery cell seal. For example, the polymer 305 may be sealed with the polymer of the separator, and/or an edge region of an additional current collector 300. This may produce a seal to enclose the interior of the cell to prevent electrolyte leakage. By using insulative polymers for the current collectors, seal 140 may not be needed in embodiments according to the present technology because the current collectors may be directly sealed together.

Current collector 300 may also include a conductive material 320 disposed along one or more surfaces of the polymer 305. In embodiments, the conductive material may be disposed over the metal, which may be positioned between the conductive material 320 and the polymer 305. The conductive material 320 may be located within first region 312, and may not extend outward as far as metal 315. The conductive material 320 may be disposed within the apertures of the polymer 305, and may extend fully through a thickness of the polymer 305 in some embodiments as will be described in more detail below.

Figure 4:
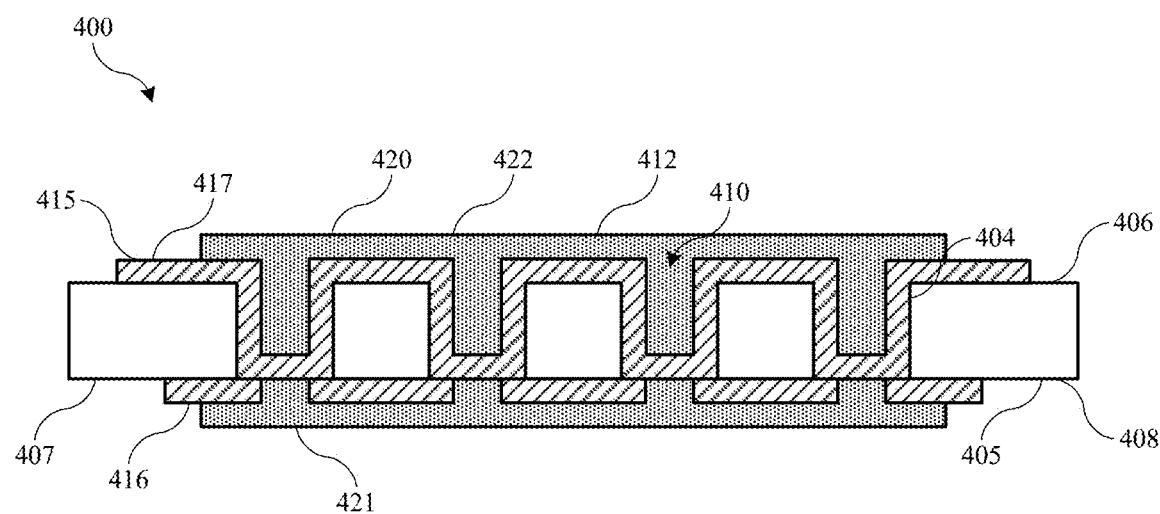
FIG. 4 shows a schematic cross-sectional view of an exemplary current collector according to some embodiments of the present technology.

Turning to FIG. 4 is shown a schematic cross-sectional view of an exemplary current collector 400 according to some embodiments of the present technology. Current collector 400 may be current collector 300 in some embodiments, although current collector 400 may include some or all aspects of current collector 300 as discussed above. For example, current collector 400 may include a polymer 405 defining a plurality of apertures 410 through the polymer film. Polymer 405 may be characterized by a first surface 406 and a second surface 408 opposite the first surface 406. Although current collector 400 may be oriented in any direction with respect to active materials disposed on the current collector 400, in some embodiments active material may be disposed along second surface 408 of current collector 400. Accordingly, first surface 406 may face outside of a battery cell including current collector 400, and may be coupled with a current collector of an adjacent cell of a battery stack.

A metal 415 may be disposed across one or more surfaces of the polymer 405, and as illustrated may be at least partially coated across first surface 406 and second surface 408 in some embodiments. Additionally, metal 415 may extend along sidewalls 404 of the apertures defined through the polymer 405. Depending on the formation process, metal 415 may not fully coat the sidewalls of the apertures 410 defined through polymer 405, although metal 415 may substantially line the sidewalls in embodiments, and may line more than 90% of the surface or the exposed surface of the sidewalls in some embodiments. Metal 415 may be formed in multiple operations, and thus may include a first portion 416 formed along second surface 408 of polymer 405, and may include a second portion 417 formed along first surface 406, and which may extend along sidewalls 404 of polymer 405 in some embodiments. Metal 415 may substantially line polymer 405 within first region 412 of the current collector 400 along both the first surface 406 and the second surface 408 of the polymer. Additionally, metal 415 may extend further towards an edge region 407 of the polymer 405 along first surface 406 than on second surface 408.

As noted above, in some embodiments, active material may be disposed along second surface 408 of the polymer 405, and first surface 406 may face the exterior of a battery cell in which current collector 400 is used. Second surface 408 may be included as part of a seal for the battery cell, and thus metal 415 may not extend into edge region 407 of polymer 405 to allow the polymer to be directly sealed with a separator and or another current collector without providing a conductive path for shorting between the two current collectors. Polymeric materials may provide a liquid seal, although the materials may be susceptible to permeation of water vapor from outside the battery cell over time. Accordingly, second portion 417 of metal 415 may extend across first surface 406 towards an edge region 407, and may extend fully to an edge of polymer material 405. Additionally, second portion 417 of metal 415 may not be formed to the same thickness as first portion 416, and in some embodiments, second portion 417 of metal 415 may be at least twice the thickness of first portion 416. In some embodiments second portion 417 of metal 415 may extend into what may become a part of gap region 155 of the current collector where a seal may be formed between current collectors of a battery cell, although the second portion 417 of metal 415 may not fully extend to an edge region. By extending to where a seal is formed, water vapor ingress through the polymer current collector may be substantially or essentially prevented.

Current collector 400 may also include a conductive material 420 disposed across surfaces of the current collector 400. Conductive material 420 may be disposed overlying first surface 406 and second surface 408 of polymer 405. In some embodiments conductive material 420 may be disposed overlying metal 415, and may not directly contact polymer 405, although in other embodiments conductive material 420 may directly contact polymer 405. Similar to the metal 415, conductive material 420 may be provided in multiple segments, and may include coating second side 408 with a first portion 421 in one operation, and coating first side 406 with a second portion 422 in a second operation. In some embodiments, the metallization and conductive material coating may alternate on sides of the polymer. For example, first portion 416 of metal 415 may be formed along second surface 408 of polymer 405. Apertures 410 may then be formed through the polymer although in other embodiments the apertures may have already been formed. First portion 422 of conductive material 420 may then be coated across second surface 408 of polymer 405.

Subsequently, second portion 417 of metal 415 may be formed across first surface 406 of polymer 405, and which may extend within apertures 410 to cover a backside of first portion 421 of conductive material 420. Second portion 422 of conductive material 420 may then be coated over first surface 406 of polymer 405, and may extend within apertures 410. This may provide conductive paths through polymer 405 allowing current collector 400 to transmit current in a z-direction, or vertically through the polymer 405. Because first portion 421 may at least partially extend within apertures 410, second portion 417 of metal 415 may not fully line sidewalls 404 of polymer 405 as previously described. However, metal 415 may line at least about 50% of the sidewalls of apertures 410 in some embodiments, and may line at least about 60%, at least about 70%, at least about 80%, at least about 90%, at least about 95%, at least about 99%, or may fully line the apertures 410.

The materials used in current collector 400 may be formed to maintain a minimal thickness. For example, polymer 405 may include any number of polymers including polypropylene, including bi-oriented polypropylene, polyethylene, polyethylene terephthalate, or other insulative materials that may operate as a base for forming the current collector. As noted above, the polymer may have minimal conductivity, and may not include conductive additives, which may allow the polymer to similarly operate as a portion of the battery cell seal. Accordingly, polymer 405 may also be formed of or include any of the materials discussed above for separator 130.

The polymer 405 may be characterized by any thickness, and in some embodiments may be of a reduced thickness to promote thinner battery cells within a battery stack. For example, polymer 405 may be characterized by a thickness less than or about 100 µm, and in embodiments may be characterized by a thickness less than or about 80 µm, less than or about 60 µm, less than or about 50 µm, less than or about 40 µm, less than or about 30 µm, less than or about 25 µm, less than or about 20 µm, less than or about 15 µm, less than or about 10 µm, less than or about 9 µm, less than or about 8 µm, less than or about 7 µm, less than or about 6 µm, less than or about 5 µm, less than or about 4 µm, less than or about 3 µm, less than or about 2 µm, less than or about 1 µm, or less. A certain minimum thickness may be maintained to facilitate formation of apertures 410 without damaging the polymer 405. Additionally, apertures 410 may be spaced across the polymer 405, such as across the first region, and may have a spacing between apertures of greater than or about 0.1 mm edge-to-edge, and may have a spacing greater than or about 0.3 mm, greater than or about 0.5 mm, greater than or about 0.7 mm, greater than or about 0.9 mm, greater than or about 1.0 mm, greater than or about 1.5 mm, or more. Each aperture may be characterized by a diameter of at least about 50 µm, and may be characterized by a diameter of greater than or about 75 µm, greater than or about 100 µm, greater than or about 200 µm, greater than or about 300 µm, greater than or about 400 µm, greater than or about 500 µm, greater than or about 600 µm, greater than or about 700 µm, greater than or about 800 µm, greater than or about 900 µm, greater than or about 1.0 mm, greater than or about 1.5 mm, or greater. The aperture spacing and aperture sizing may affect conductivity in the z-direction in combination with the conductive material and metal, as well as uniformity of current distribution across surfaces of the current collector.

The metal 415 may be used to facilitate z-direction conductivity while minimizing an increase in xy-direction conductivity. For example, by maintaining the thickness of the metal material below 0.5 µm, a sufficient resistivity may be maintained across the current collector. In some embodiments the metal may be deposited to a thickness of less than or about 0.4 µm, less than or about 0.3 µm, less than or about 0.2 µm, less than or about 0.1 µm, less than or about 80 nm, less than or about 60 nm, less than or about 50 nm, less than or about 40 nm, or less. As previously noted, second portion 417 of metal 415 and first portion 416 may not be the same thickness, although in some embodiments the thicknesses may be similar. For example, first portion 416 may be characterized by a thickness of less than or about 0.2 µm, or less than or about 0.1 µm, while second portion 417 may be characterized by a thickness of greater than or about 0.1 µm, or greater than or about 0.2 µm. Second portion 417 of metal 415 may also be at least about 50% greater thickness than first portion 416, and in some embodiments may be at least twice the thickness, three times the thickness, five times the thickness, ten times the thickness, or more. The metal 415 may be any metal that may facilitate conductivity through the current collector. Exemplary metal may be or include aluminum, copper, nickel, tin, zinc, titanium, silver, molybdenum, palladium, and platinum. Although the conductive material may limit or prevent interaction of electrolyte with metal 415, in some embodiments the metal may be selected based on the electrical potential of the current collector 400. For example, in some embodiments, when used as a cathode current collector, metal 415 may be aluminum, and when used as an anode current collector, metal 415 may be copper or nickel, although other metals may be used.

Conductive material 420 may include any number of materials that may facilitate z-direction transmission of current across current collector 400. Although conductive material 420 may include metal or other directly conductive materials noted above, conductive material 420 may include a conductive filler incorporated within a binder to maintain a particular resistivity. Because current collector 400 may be configured to transmit current through the current collector, which may have a thickness in the micron range, conductivity may be much lower than in conventional cells that may transfer current over millimeters or more in the xy-direction of a current collector. Accordingly, conductive material 420 may be configured to produce a resistivity in a z-direction through current collector 400 of between about 0.1 Ω·m and about 1 Ω·m. Metal 315 may facilitate xy-direction transmission of current within the first region 412, although the resistivity may be greater than some conventional current collectors. For example, an xy-direction resistivity across first region 412 may be between about 0.0001 Ω·m and about 0.1 Ω·m, or between about 0.0005 Ω·m and about 0.01 Ω·m. Because current may transfer through current collector 400 at specific locations in which the apertures are located, by having a lower xy-direction resistivity, a substantially uniform current may be provided to active materials of the battery cell. However, by maintaining edge region 407 free of metal material, the xy-directional transmission of current may be limited to the active regions of the battery cells.

Exemplary conductive materials may include conductive inks or metallic powder mixed within a binder or adhesive. For example, any of the previously noted metals as well as carbon black, graphite, or other conductive materials may be mixed within a binder in a proportion to produce the z-directional resistivity values noted above. The binder may be used to provide multiple functions including a seal against electrolytic leakage or contact with metal 415, as well as facilitate lamination of current collectors between adjacent cells of a stacked battery. Any binder may be used, such as polymeric binders, and may be characterized by a chemical stability with any of the electrolytic materials previously noted.

Figure 5:
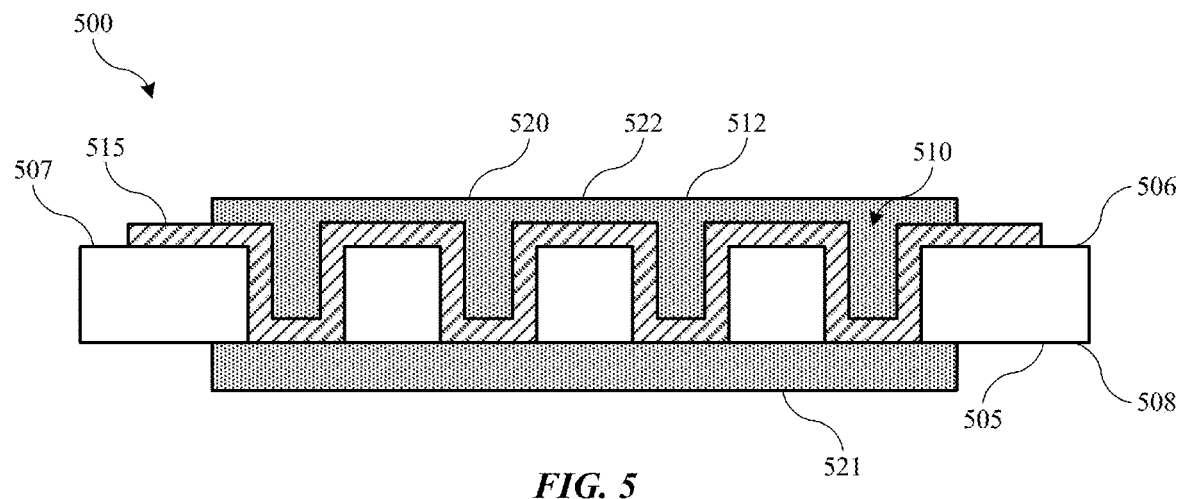
FIG. 5 shows a schematic cross-sectional view of an exemplary current collector according to some embodiments of the present technology.

Current collector 400 may be used as a cathode current collector or an anode current collector in embodiments of the present technology. However, because some anode active materials may be characterized by sufficient conductivity, such as carbon-based anode materials, some current collectors of the present technology may not include metal along a surface of the current collector along which active material may be applied. FIG. 5 shows a schematic cross-sectional view of an exemplary current collector 500 according to some embodiments of the present technology. Current collector 500 may be similar to current collector 400, and may include any of the materials previously discussed.

For example, current collector 500 may include a polymer 505 having apertures 510 defined there through. Polymer 505 may be the same as polymer 405, or may be different although polymer 505 may be any of the previously discussed polymeric materials. In some embodiments, a first portion 521 of a conductive material 520 may be disposed along a second surface 508 of polymer 505, which may be a surface along which an active material, such as an anode active material, may be disposed. Different from current collector 400, first portion 521 of conductive material 520 may directly contact polymer 505, and a metal material may not be disposed between the conductive material and the polymer. The rest of current collector 500 may be similarly formed as previously described, and may include a metal 515 extending across first surface 506 along first region 512, although edge region 507 may be maintained free of metal 515 as discussed above. A second portion 522 of conductive material 520 may be deposited overlying metal 515, and may extend within apertures 510 in embodiments. This configuration of a current collector may reduce cost and fabrication time when the active material provides sufficient conductivity.

Figure 6:
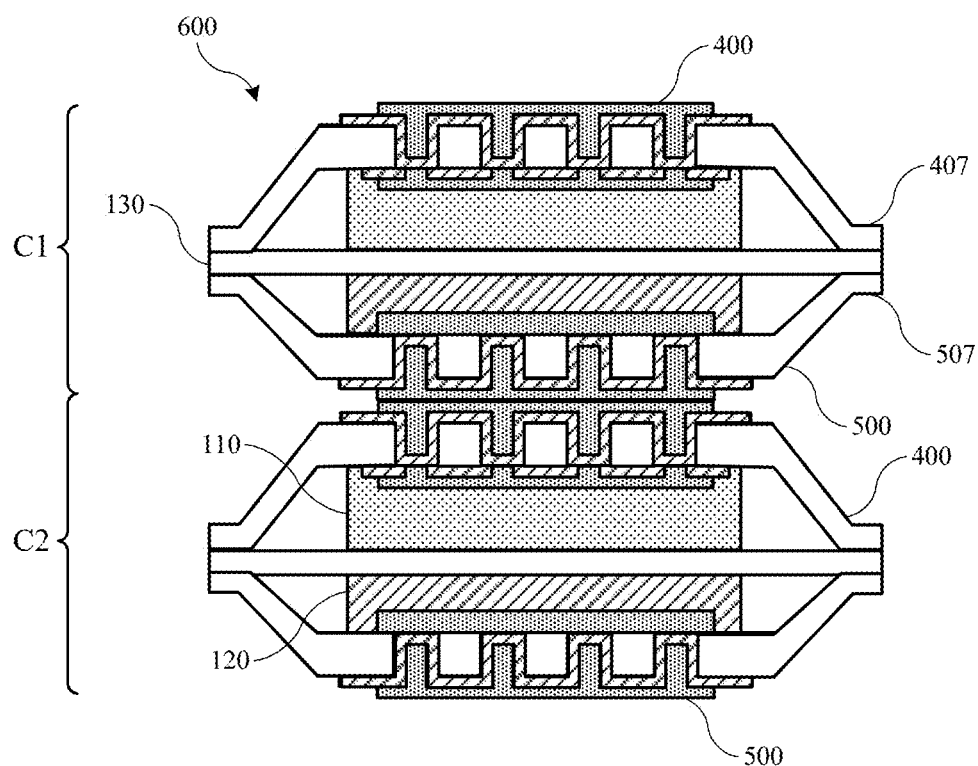
FIG. 6 shows a schematic cross-sectional view of a stacked battery according to some embodiments of the present technology.

FIG. 6 shows a schematic cross-sectional view of a stacked battery 600 according to some embodiments of the present technology. Stacked battery 600 may include a portion of stacked battery 100 described above, although several components have been removed for illustrative purposes. It is to be understood, however, that any of the components previously discussed may be included in stacked battery 600. Stacked battery 600 illustrates one possible coupling of two battery cells C1 and C2, which may include current collectors according to the present technology. For example, each cell may include a cathode active material 110, and an anode active material 120 separated by a separator 130 as previously described. Cathode active material 110 of each cell may be disposed along a first region of a current collector 400 as previously described. Additionally, anode active material 120 may be disposed along current collector 500 as previously described, although current collector 400 may also be used in embodiments.

Stacked battery 600 may not include a seal 140 as previously discussed because the edge regions 407, 507 of current collectors 400, 500 may be used to form the seal of each cell. As illustrated, edge regions 407, 507 are sealed with separator 130 to produce a fluid seal for each cell. In other embodiments edge region 407 may be directly coupled with edge region 507 to produce the seal, in which separator 130 may not be included. Because non-conductive polymers may be used for the current collectors, a direct seal may be formed by heat-sealing or otherwise bonding the edge regions of the current collectors together or with the separator 130.

Additionally, anode current collector 500 of cell C1 may be coupled with cathode current collector 400 of cell C2 along a first surface of each current collector. As illustrated, anode current collector 500 of cell C1 and cathode current collector 400 of cell C2 may be directly connected to facilitate z-directional transmission of current through the battery cells. The conductive material 420, 520 previously described, may facilitate the coupling of the two cells by allowing a bond to be formed across the two current collectors, which may both have the first surfaces coated with a similar conductive material. In this way, current transmission across the cells may be more uniform due to a consistent adhesive surface between the adjacent current collectors.

Figure 7:
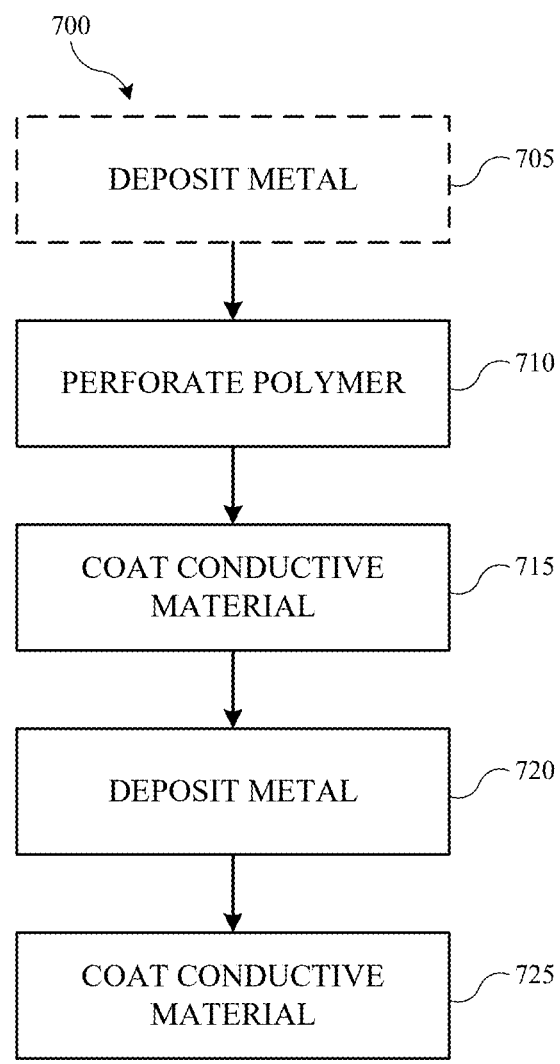
FIG. 7 shows selected operations in a method of forming a current collector according to some embodiments of the present technology.

FIG. 7 shows selected operations in a method 700 of forming a current collector according to some embodiments of the present technology. The methods may be used in the formation of current collector 400 and current collector 500 previously described. Method 700 may include receiving a polymer material, such as from a roll of polymeric material. The method may optionally include depositing metal along a first surface of the polymer at optional operation 705. The operation may be optional depending on whether current collector 400 is being formed in which metal may be formed across second surface 408 as previously described. The metal deposition may be performed in a number of ways to produce a uniform coverage of metal at a thickness of less than 1 µm, or less than 0.1 µm. For example, exemplary operations may include chemical vapor deposition, electrodeposition, sputtering, or various other forms of metal deposition to provide a substantially conformal coating across the first surface of the polymer film.

The polymer may be perforated at operation 710 to define a plurality of apertures through the polymer film. For example, the apertures may be formed via a laser ablation, or a roller process, which may use needles to form the perforations. The apertures may not extend fully across the polymer, and may be limited to a first interior region of the polymer in some embodiments, which may maintain a frame of polymer around the first portion including the apertures. At operation 715, a conductive material may be coated across the first region of the polymer film along a first surface of the polymer film. The conductive material may include a conductive filler incorporated within a binder or adhesive as previously discussed. The conductive material may be coated in a variety of ways including by spraying, gravure coating, doctor blade coating, or any other way of providing the conductive material over the first region of the polymer film.

A metal or other conductive layer may be formed across a second surface of the polymer film opposite the first surface at operation 720. During this operation, the metal may at least partially coat sidewalls of the apertures as previously described. Similar processes may be used to form the layer of metal material, and in some embodiments the process may conformally line the second surface as well as along the sidewalls of the apertures. At operation 725, the second surface of the polymer film may be coated with the conductive material. This operation may substantially fill the apertures with the conductive material, which may provide, tune, or facilitate a z-direction capability of current transmission through the current collector. The current collector may then be singulated from the roll of material in some embodiments and utilized in a battery cell, or battery, including a stacked battery as discussed throughout the present disclosure. By utilizing current collectors according to the present technology, materials may be saved by removing a seal between current collectors in some embodiments, and a tuned conductivity may be provided in both the z-direction through the current collector as well as across surfaces of the current collector in the xy-direction.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A stacked battery comprising:
    a first battery cell having:
        a first cathode current collector comprising a first polymer and a first metal at least partially coating the first polymer, wherein the first cathode current collector is characterized by a first surface and a second surface opposite the first surface, and a first anode current collector comprising a second polymer and a second metal at least partially coating the second polymer, wherein the first anode current collector is characterized by a first surface and a second surface opposite the first surface; and
    a second battery cell having:
        a second cathode current collector comprising the first polymer and the first metal at least partially coating the first polymer, wherein the second cathode current collector is characterized by a first surface and a second surface opposite the first surface, and
        a second anode current collector comprising the second polymer and the second metal at least partially coating the second polymer, wherein the second anode current collector is characterized by a first surface and a second surface opposite the first surface, and wherein the first anode current collector is coupled with the second cathode current collector along the first surface of the first anode current collector and the first surface of the second cathode current collector.

2. The stacked battery of claim 1, wherein the first polymer of the first cathode current collector and the second cathode current collector define apertures through the first polymer, and wherein the first metal at least partially lines the first surface, the second surface, and sidewalls of the apertures of the first cathode current collector and the second cathode current collector.

3. The stacked battery of claim 1, wherein the second polymer of the first anode current collector and the second anode current collector define apertures through the second polymer, and wherein the second metal at least partially lines the first surface and sidewalls of the apertures of the first anode current collector and the second anode current collector.

4. The stacked battery of claim 1, further comprising a conductive material coated along the first surface and the second surface of each current collector of the stacked battery.

5. The stacked battery of claim 4, wherein the conductive material is disposed within apertures defined through each current collector of the stacked battery.

6. The stacked battery of claim 4, wherein the conductive material comprises a conductive filler disposed within a binder.

7. The stacked battery of claim 1, wherein the first metal and the second metal are selected from the group consisting of aluminum, copper, nickel, tin, zinc, titanium, silver, molybdenum, palladium, and platinum.

8. The stacked battery of claim 7, wherein the first metal is aluminum, and wherein the second metal comprises copper or nickel.

9. The stacked battery of claim 1, wherein the first polymer and the second polymer comprise insulative polymers comprising one or more of polypropylene, polyethylene, or polyethylene terephthalate.

* * * * *